(12) United States Patent
Suzuki et al.

(10) Patent No.: US 7,966,460 B2
(45) Date of Patent: Jun. 21, 2011

(54) INFORMATION USAGE CONTROL SYSTEM, INFORMATION USAGE CONTROL DEVICE AND METHOD, AND COMPUTER READABLE MEDIUM

(75) Inventors: Toshikatsu Suzuki, Tokyo (JP); Rumiko Kakehi, Tokyo (JP); Takanori Nakanowatari, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 569 days.

(21) Appl. No.: 12/127,056

(22) Filed: May 27, 2008

(65) Prior Publication Data

US 2009/0164697 A1 Jun. 25, 2009

(30) Foreign Application Priority Data

Dec. 19, 2007 (JP) ................................. 2007-326772

(51) Int. Cl.
*G06F 12/00* (2006.01)
(52) U.S. Cl. ...................................................... 711/154
(58) Field of Classification Search .................. None
See application file for complete search history.

(56) References Cited

U.S. PATENT DOCUMENTS

| 2001/0049610 A1* | 12/2001 | Hazumi | 705/3 |
| 2004/0255138 A1* | 12/2004 | Nakae | 713/193 |
| 2006/0206925 A1 | 9/2006 | Dillaway et al. | |

FOREIGN PATENT DOCUMENTS

JP 2006254464 9/2006

\* cited by examiner

*Primary Examiner* — Hiep T Nguyen
(74) *Attorney, Agent, or Firm* — Gauthier & Connors LLP (57) ABSTRACT

A system includes a first device and one or more second devices that each provides a user with usage information for using target information, based on control information, wherein the first device has a memory that stores the control information which contains device information and condition information, so as to be associated with the target information, a receiving unit that receives from a requester a request, an inquiry unit that inquires of the second device, when the requester is not managed by its own device, about whether the requester is managed by the device, and a providing unit that provides the requester, when, based on a response to the inquiry and the memory, the requester is managed by the second device designated by the device information, with the usage information, based on the condition information, and the second device has a response unit that sends the response to the inquiry.

9 Claims, 11 Drawing Sheets

SERVER 10

| USER ID |
|---|
| USER 3 |
| USER 4 |
| ... |

SERVER 20A

| USER ID |
|---|
| USER 1 |
| USER 2 |
| ... |

FIG. 5

| POLICY ID | PERMITTED USER | VALID PERIOD | PERMITTED OPERATIONS |
|---|---|---|---|
| POLICY 1 | USER 3 | UNLIMITED | REVIEW, EDIT |
|  | USER 4 | 2007-09-01 – 2008-08-31 | PRINT |
|  | ... | ... | ... |
| POLICY 2 | GROUP 1 | 2007-09-01 – 2007-09-30 | REVIEW |
|  | ... | ... | ... |
| ... |  |  |  |

FIG. 6

| CONTENT ID | POLICY ID |
|---|---|
| CONTENT 1 | POLICY 1 |
| CONTENT 2 | POLICY 2 |
| ... | ... |

FIG. 7

| SERVER ID | TRUST LEVEL |
|---|---|
| SERVER 20A | 4 |
| SERVER 20B | 2 |
| ... | ... |

FIG. 8

| POLICY ID | PERMITTED USER | VALID PERIOD | PERMITTED OPERATIONS |
|---|---|---|---|
| POLICY 1 | USER 3 | UNLIMITED | REVIEW, EDIT |
| | USER 4 | 2007-09-01 ~ 2008-08-31 | PRINT |
| | SERVER WITH TRUST LEVEL 4 | ONE MONTH FROM ISSUE DATE | PRINT |
| | SERVER WITH TRUST LEVEL 2 | ISSUE DATE | REVIEW |
| | ... | ... | ... |
| POLICY 2 | GROUP 1 | 2007-09-01 ~ 2007-09-30 | REVIEW |
| | ... | ... | ... |
| ... | ... | ... | ... |

| POLICY ID | PERMITTED USER | VALID PERIOD | PERMITTED OPERATIONS |
|---|---|---|---|
| POLICY 1 | USER 3 | UNLIMITED | REVIEW, EDIT |
| | USER 4 | 2007-09-01 – 2008-08-31 | PRINT |
| | SERVER WITH TRUST LEVEL 4 | OUTSIDE INFORMATION APPLIED | REVIEW |
| | SERVER WITH TRUST LEVEL 2 | ISSUE DATE | REVIEW |
| | ... | ... | ... |
| POLICY 2 | GROUP 1 | 2007.9.1 – 2007.9.30 | REVIEW |
| | ... | ... | ... |
| ... | | | |

| SERVER ID | TRUST LEVEL |
|---|---|
| SERVER 10A | 5 |
| SERVER 10B | 1 |
| ... | ... |

FIG. 16

| GROUP | VALID PERIOD | PERMITTED OPERATIONS |
|---|---|---|
| SERVER WITH TRUST LEVEL 6 | UNLIMITED | REVIEW, EDIT |
| SERVER WITH TRUST LEVEL 5 | 2007-09-01 – 2008-08-31 | PRINT |
| SERVER WITH TRUST LEVEL 4 | THREE DAYS FROM ISSUE DATE | REVIEW |
| ... | ... | ... | ns
INFORMATION USAGE CONTROL SYSTEM, INFORMATION USAGE CONTROL DEVICE AND METHOD, AND COMPUTER READABLE MEDIUM

CROSS-REFERENCE TO RELATED APPLICATIONS

This application is based on and claims priority under 35 USC 119 from Japanese Patent Application No. 2007-326772 filed on Dec. 19, 2007.

BACKGROUND

1. Technical Field

The present invention relates to an information usage control system, an information usage control device and method, and a computer readable medium.

2. Related Art

There is known a digital rights management (DRM: Digital Rights Management) system for controlling use of content by means of a security policy.

SUMMARY

According to an aspect of the invention, there is provided an information usage control system including a first information usage control device and one or more second information usage control devices that each provides, upon receipt from a user managed by its own information usage control device a request for usage information for control target information, the user with the usage information for using the control target information, based on usage control information for controlling use of the control target information, wherein the first information usage control device has a memory that stores the usage control information which possibly contains permitted device information designating a second information usage control device permitted to use the control target information and usage condition information describing usage condition for the control target information, in relation to the permitted device information, so as to be associated with the control target information, a receiving unit that receives from a requester the request for the usage information for the control target information, an inquiry unit that inquires of the second information usage control device, when the requester is not a user managed by its own information usage control device, about whether or not the requester is managed by the second information usage control device, and a providing unit that provides the requester, when it is found, based on a response in response to the inquiry and the information stored in the memory, that the requester is a user managed by the second information usage control device designated by the permitted device information associated with the control target information, with the usage information for using the control target information, based on the usage condition information in relation to the permitted device information, and the second information usage control device has a response unit that sends the response in response to the inquiry from the first information usage control device to the first information usage control device.

BRIEF DESCRIPTION OF THE DRAWINGS

Exemplary embodiments of the present invention will be described in detail by reference to the following figures, wherein.

DETAILED DESCRIPTION

In the following, exemplary embodiments of the present invention will be described.

First Exemplary Embodiment

Figure 1:
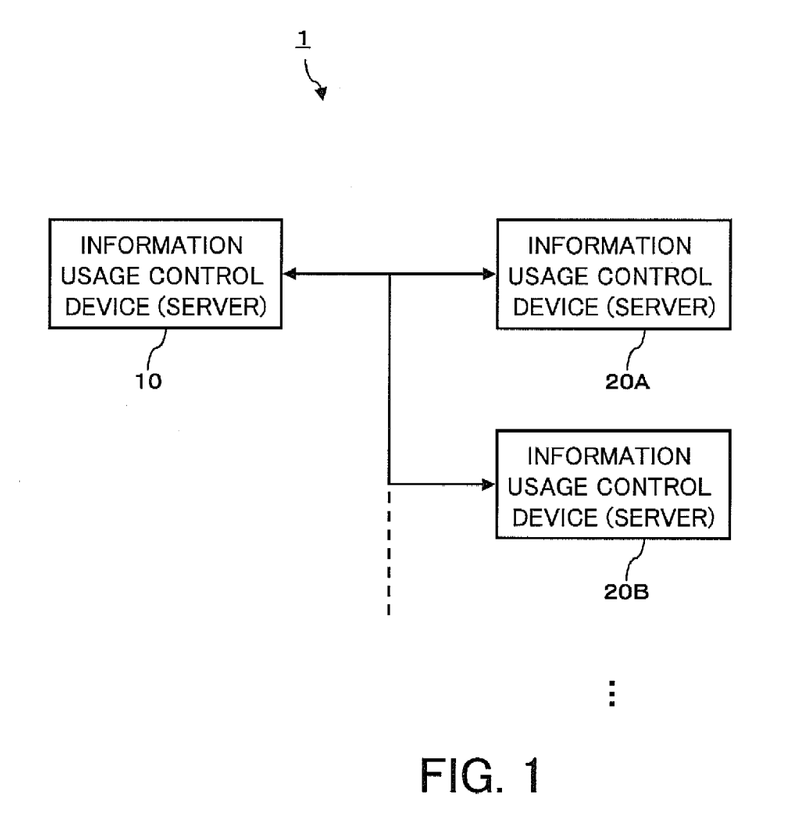
FIG. 1 is a block diagram showing one example of a structure of an information usage control system according to a first exemplary embodiment.

FIG. 1 is a block diagram showing one example of a structure of an information usage control system 1 according to a first exemplary embodiment. In FIG. 1, the information usage control system 1 includes a plurality of information usage control devices 10, 20A, 20B.

The information usage control devices 10, 20A, 20B, in response to respective requests from users managed by their own devices, respectively, for usage information for information to be controlled (control target information), provide the users with usage information for using the control target information, based on usage control information for controlling use of the control target information.

The information usage control system 1 is formed such that the information usage control device 10 can provide users managed by the information usage control devices 20A, 20B, respectively, with usage information.

The information usage control device 10 is connected to the information usage control devices 20A, 20B for communication. According to one aspect, the information usage control devices 10, 20A, 20B are mutually connected via a network such as the Internet, or the like.

According to one aspect, the information usage control devices 10, 20A, 20B are each realized in cooperation between hardware resources and software; specifically, computers, for example. Specifically, the respective functions of the information usage control devices 10, 20A, 20B are realized by reading an information usage control program from a recording medium into a main memory and executing the read program by a CPU (Central Processing Unit). The information usage control program can be provided as stored in a computer readable recording medium, such as a CD-ROM or the like, or through transmission in the form of a data signal. Alternatively, the information usage control devices 10, 20A, 20B may be each realized solely by means of hardware. The information usage control devices 10, 20A, 20B may be each realized using one physical device or two or more physical devices.

Specifically, according to one aspect, the information usage control devices 10, 20A, 20B are server computers. Accordingly, an information usage control device is hereinafter referred to as a "server." When the servers 20A and 20B need not be discriminated from each other, the servers 20A, 20B are collectively referred to as a "server 20."

Although two servers 20A, 20B are shown as servers other than the server 10 in the example shown in FIG. 1, any number, equal to or greater than one, of servers may be provided as servers other than the server 10. That is, e.g., three or more servers may be provided.

Figure 2:
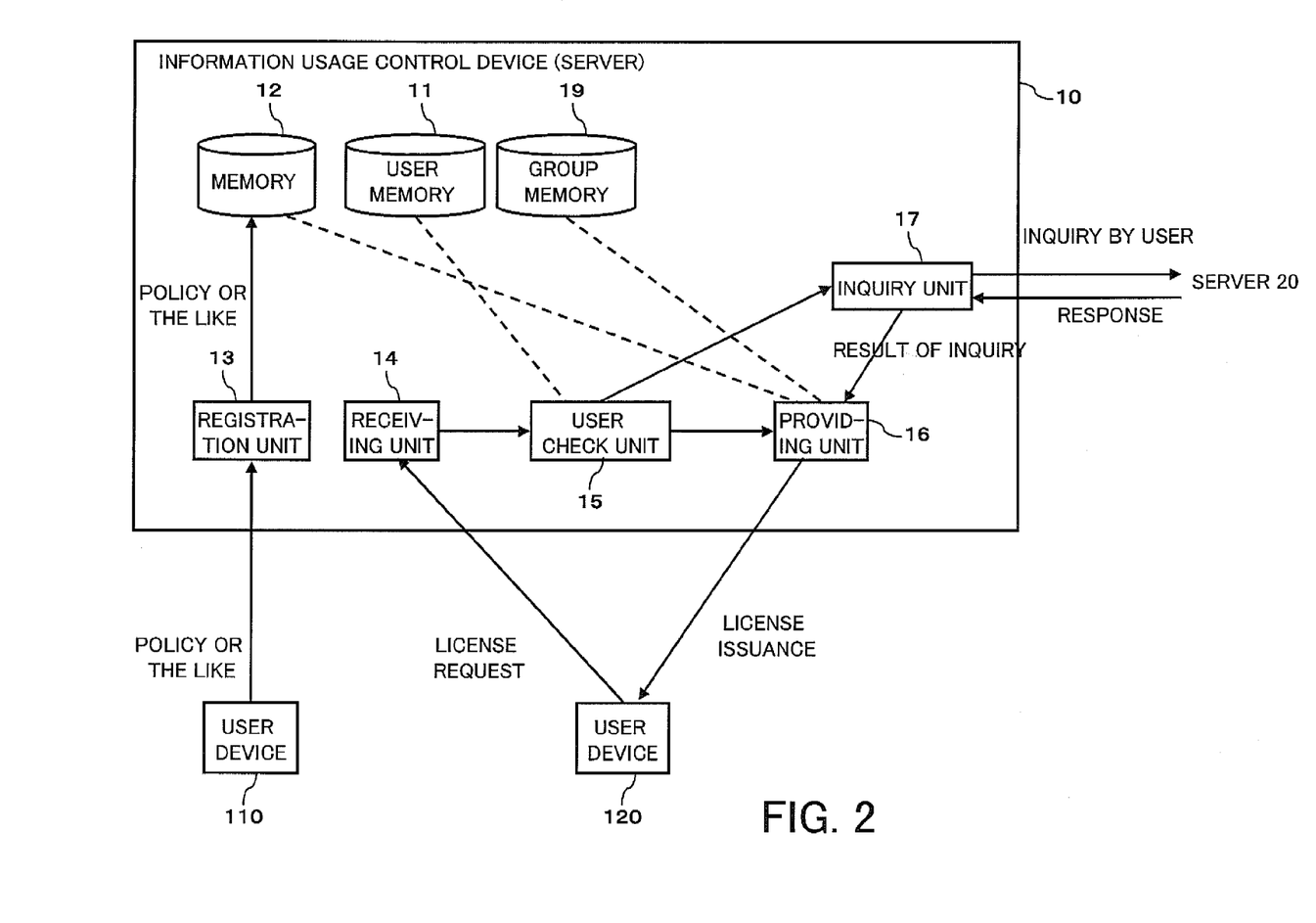
FIG. 2 is a block diagram showing one example of a structure of a server 10.
Figure 3:
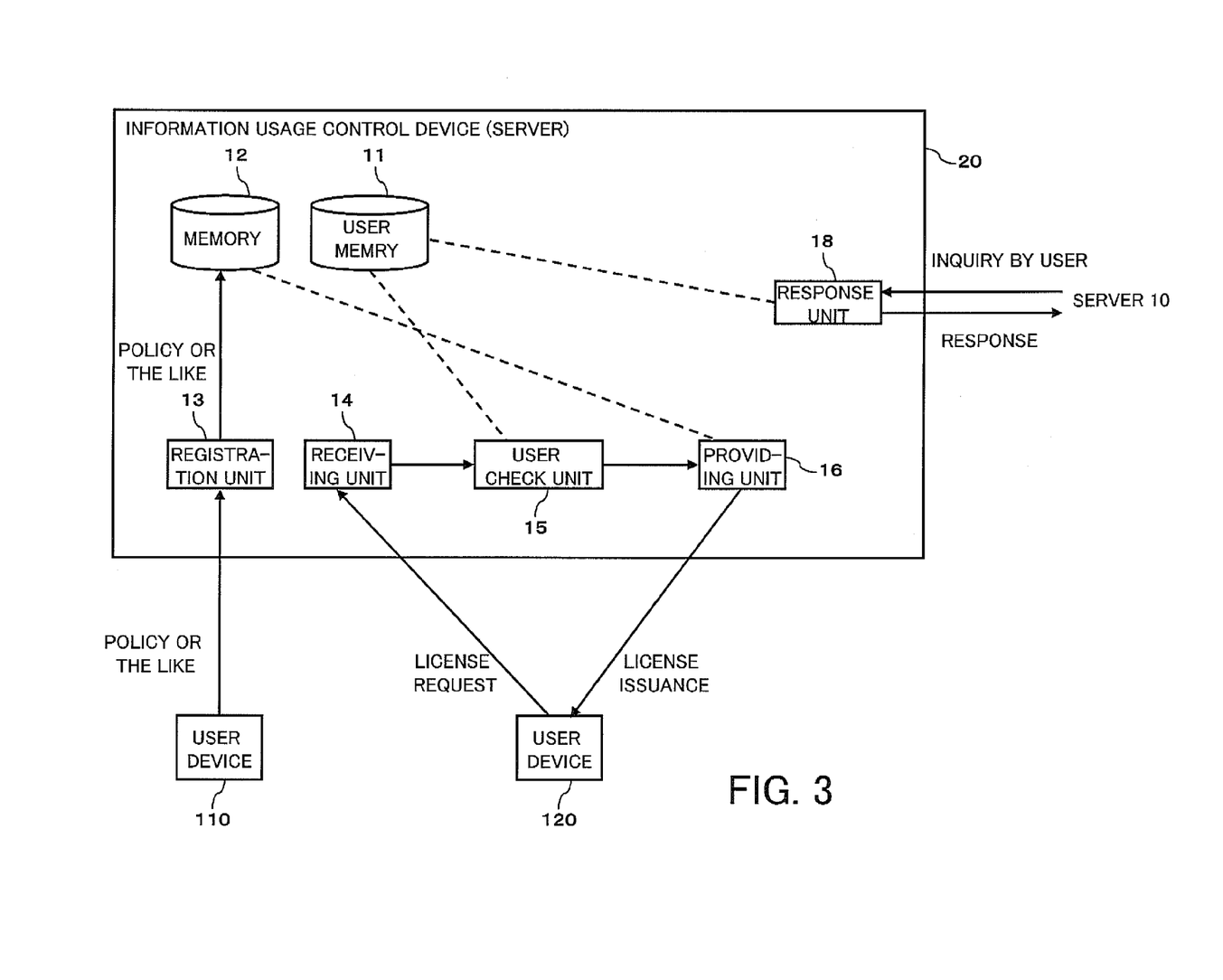
FIG. 3 is a block diagram showing one example of a structure of a server 20.

FIG. 2 is a block diagram showing one example of a structure of the server 10; and FIG. 3 is a block diagram showing one example of a structure of the server 20. In FIGS. 2 and 3, functional blocks having similar functions are given identical reference numerals.

As shown in FIGS. 2 and 3, the servers 10, 20 each include a user memory 11, a memory 12, a registration unit 13, a receiving unit 14, a user check unit 15, and a providing unit 16.

The user memory 11 stores identification information (hereinafter referred to as a "user ID") identifying a user managed by its own server.

Figure 4:
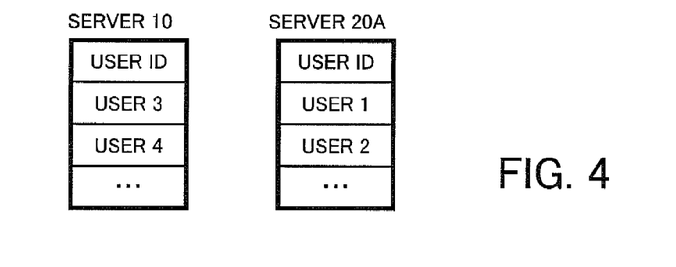
FIG. 4 is a diagram showing one example of content stored in user memories of the servers 10 and 20A.

FIG. 4 shows one example of content stored in the user memories 11 of the servers 10 and 20A.

The memory 12 stores usage control information for controlling use of control target information, so as to be associated with the control target information. For example, the memory 12 stores usage control information for controlling use of control target information and identification information identifying the control target information, so as to be associated with each other.

The control target information is information to be controlled as to its use, and specifically, content, including, for example, documents, motion pictures, static images, sounds, and so forth. Although the control target information is in the form of electronic data, according to one aspect, any information other than electronic data, such as information written on paper, is applicable. The control target information is hereinafter referred to as "content."

According to one aspect, content is protected with encryption or the like. According to this aspect, the memory 12 may store protection-releasing information, such as information for decrypting content, for releasing content from protection, so as to be associated with the content.

The usage control information is information for controlling use of content, including, for example, information about condition or range for permitting use of content, information about restrictions on use of content, and so forth. Specifically, the usage control information contains information about a user, period, frequency, and/or operation with respect to which use of concerned content is permitted, or a combination thereof. For example, the usage control information describes which user is permitted to carry out what kind of operation during a period from when to when. The usage control information may be referred to as, e.g., security policy, and is hereinafter referred to as a "policy."

The memory 12 includes, e.g., a policy table for managing policies and an association table for managing association between content and policies.

Figure 5:
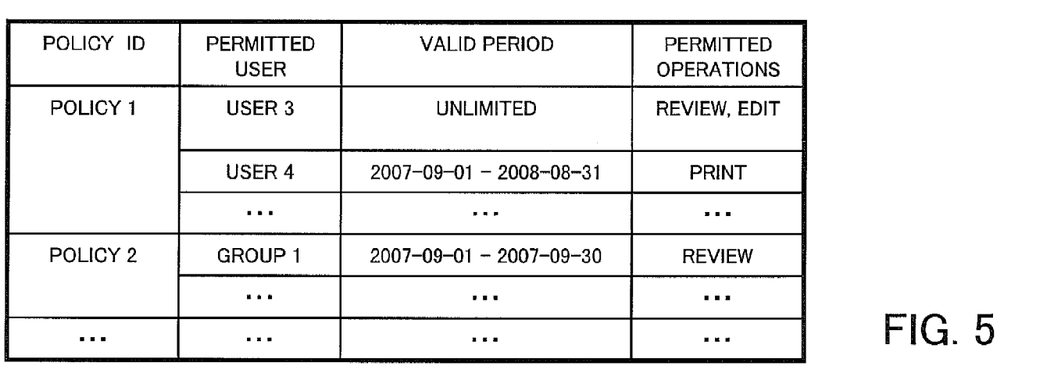
FIG. 5 is a diagram showing one example of a policy table of the server 10.

FIG. 5 is a diagram showing one example of the policy table of the server 10. In the example shown in FIG. 5, the policy table shows, for each policy, a policy ID, or identification information identifying the policy, and content of the policy so as to be associated with each other. Each policy includes information designating one or more users or user groups permitted to use concerned content, and usage condition information describing usage condition, usage permission, or permitted content, all defined for and given to each user or user group. The usage condition information includes information designating a valid period, or a period during which use of content is permitted, and/or permitted operation.

Figure 6:
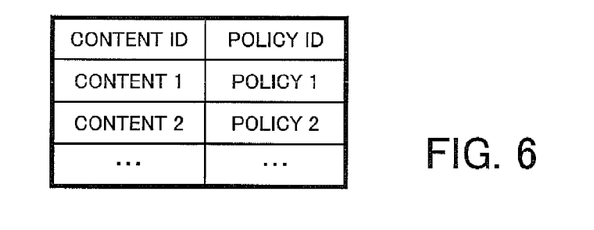
FIG. 6 is a diagram showing one example of an association table of the server 10.

FIG. 6 is a diagram showing one example of an association table of the server 10. In the example shown in FIG. 6, the association table shows, for each set of content, the content ID, or identification information identifying the content, and the policy ID of a policy for controlling use of the content, so as to be associated with each other.

The registration unit 13, upon receipt from a user of information to be registered in the memory 12, registers the information in the memory 12. For example, the registration unit 13 receives information to be registered in the memory 12 from a device (hereinafter referred to as a "user device") 110, such as a personal computer (PC) or the like, connected to the server and used by a user, and registers the information in the memory 12.

According to one aspect, the registration unit 13 receives a policy from a user, and registers the policy in the policy table so as to be associated with the policy ID thereof. Further, the registration unit 13 receives designation of the content ID and policy ID from a user, and registers the designated content ID and policy ID in the association table so as to be associated with each other, in which the content ID is contained in the content identified by itself. According to an aspect involving content protected with encryption or the like, for example, the registration unit 13, when defining association, provides a user with protection information (e.g., an encryption key) for protecting content, and registers protection release information (e.g., a decryption key) for releasing content from protection in the association table so as to be associated with the content ID. The user protects (e.g. by encryption) the content, using the protection information.

The above described policy registration in the policy table and association in the association table may be carried out by either the same user or user device or by different users or user devices.

Further, the registration unit 13 receives from a user authentication information (a user ID, a password, and so forth) for authenticating the user, then carries out an authentication process with respect to the user, based on the received authentication information, and with the user authenticated, provides the user with the function of the registration unit 13. For example, the registration unit 13 receives the user ID from a user, and provides the user with the function of the registration unit 13 when a user ID identical to the received user ID is registered in the user memory 11, and otherwise does not provide the function.

The receiving unit 14 receives from a requester a request for usage information in relation to content. For example, the receiving unit 14 receives a request for usage information in relation to content from a user device 120 operated by the requester.

The user check unit 15 checks whether or not the requester having sent the request received by the receiving unit 14 is a user managed by the server. Specifically, the receiving unit 14 receives a user ID from the requester; and the user check unit 15 checks whether or not the user ID of the requester is registered in the user memory 11.

When it is determined that the requester is a user managed by its own server; specifically, when the user check unit 15 finds that the requester is a user managed by its own server, the providing unit 16 provides the requester with usage information for using the content, based on the policy associated with the content in relation to the request, stored in the memory 12.

The usage information may include, e.g., information for enabling use of content, information necessary to use content, information describing content usage conditions or usage permission, and so forth. Usage information is referred to as, e.g., a license, and is hereinafter referred to as a "license."

Specific examples of a license may include, e.g., the below (a1) to (a3). (a1) A license that contains information permitting use of content. In this case, the user device 120 permits a user to use content when a license is received, and otherwise does not permit such use. "To use the content" may include some specific operation among multiple kinds of operations in relation to the content. For example, the user device 120 may permit review of content regardless of whether or not a license is received, and permit printing of content only when a license is received. (a2) A license that contains information about usage conditions, such as a period, frequency, operation, and so forth, with respect to which use of content is permitted. In this case, the user device 120 permits a user to use content within a range in conformity with the usage conditions. For example, the user device 120 enables operation relative to content only in the manner permitted among multiple kinds of operations. (a3) A license that contains protection release information (e.g., a decryption key) for releasing protected content from protection. In this case, the user device 120 releases content from protection, using the protection release information. For example, the encrypted content is decrypted.

According to one aspect, based on a policy for content in relation to a request, the providing unit 16 determines whether or not the user identified by the user ID sent from the requester is permitted to use the content, and if permitted, provides the requester with a license containing usage conditions defined for the user. In the above, the providing unit 16 may determine whether or not a part or entirety of the usage conditions defined for the user is satisfied, and if satisfied, may provide the requester with a license. For example, the providing unit 16 may determine whether or not the requested use will be made within a valid period, and if within the period, may provide the requester with a license designating a permitted operation.

The respective servers 10, 20 in this embodiment are formed as described below.

The memory 12 of the server 10 stores a policy for controlling use of content, so as to be associated with the content, in which the policy can contain permitted device information designating other servers permitted to use the content (or other servers managing users permitted to use the content) and usage condition information describing usage conditions for the content, in relation to the permitted device information. That is, the policy stored in the memory 12 of the server 10 can contain permitted device information and usage condition information in relation to the permitted device information.

The permitted device information may be any information, as long as the information designates one or more other servers permitted to use content (or one or more other servers managing a user permitted to use content), including, e.g., identification information identifying a server, information identifying a server group, and so forth.

The usage condition information is similar to the above-described usage condition information defined for a user or user group, including, e.g., information specifying a valid period during which use of content is permitted, permitted operation, and so forth.

Note that the policy may include multiple pairs each including permitted device information and usage condition information.

The server 10 has an inquiry unit 17 for inquiring of the server 20 about whether or not a requester for a license is a user managed by the server 20. Specifically, when the user check unit 15 finds that the requester is not a user managed by the server 10, the inquiry unit 17 inquires of the server 20 about whether or not the requester for the license is a user managed by the server 20. The inquiry unit 17 may inquire of one or more servers 20 one by one or simultaneously.

The server 20 has a response unit 18 for sending the server 10 a response in response to an inquiry from the server 10. Specifically, the response unit 18 receives the user ID of the requester from the inquiry unit 17 of the server 10, then determines whether or not the user ID is registered in the user memory 11 of the server 20, and sends the result of determination to the inquiry unit 17 of the server 10.

When it is found that the requester for a license is a user managed by the server 10, the providing unit 16 of the server 10 provides the requester with a license for the content, based on the policy stored in the memory 12 in association with the content in relation to the request. On the other hand, when it is found that the requester for a license is not a user managed by the server 10, and it is further found, based on the response from the server 20 in response to the inquiry from the inquiry unit 17 and the information stored in the memory 12, that the requester is a user managed by the server 20 designated by the permitted device information associated with the content in relation to the request, the providing unit 16 provides the requester with a license for using the content, based on the usage condition information in relation to the permitted device information.

According to one aspect, the server 10 has a group memory 19 for storing information stating a group to which each server 20 belongs, so as to be associated with the server 20, and the memory 12 of the server 10 stores, as the permitted device information, information designating a server 20 group. When it is found, based on the information stored in the group memory 19, that the requester for a license is a user managed by a server 20 belonging to a group designated by the permitted device information associated with the content in relation to the request, the providing unit 16 of the server 10 provides the requester with a license for the content in relation to the request, based on the usage condition information in relation to the permitted device information.

No particular limitation is imposed on the manner of grouping the servers 20, although in one example, the servers 20 may be grouped based on a trust level with which the server 10 trusts each servers 20. For example, a trust level is set with respect to each server 20, and registered in the group memory 19. In policy setting, a policy indicating use of content is permitted to a server with which trust level under what use condition is set.

By way of an example of setting the above-described trust level, relatively higher trust level may be set with respect to a server 20 within the same company as that of the server 10 (e.g., a server 20 belonging to another department), and relatively lower trust level may be set with respect to a server 20 belonging to a different company from that of the server 10 (e.g., a server 20 belonging to an affiliate company).

Figure 7:
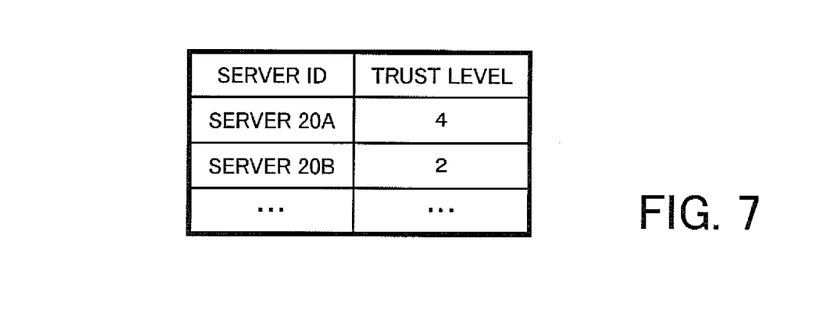
FIG. 7 is a diagram showing one example of content stored in a group memory of the server 10.

FIG. 7 is a diagram showing one example of content stored in the group memory 19. In the example shown in FIG. 7, the group memory 19 stores, for every server 20, the server ID, or identification information identifying the server 20, and a trust level of the server 20, so as to be associated with each other.

Figure 8:
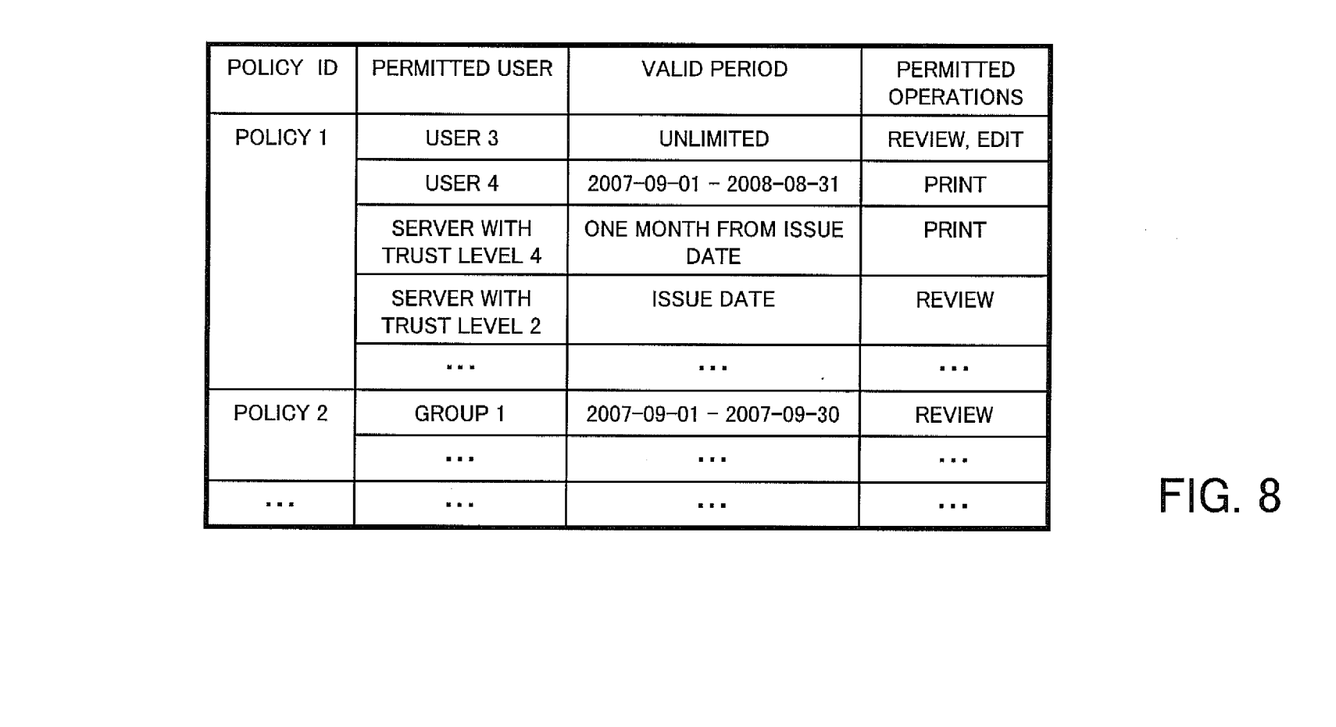
FIG. 8 is a diagram showing one example of a policy table of the server 10.

FIG. 8 is a diagram showing one example of a policy table of the memory 12 of the server 10. In the example shown in FIG. 8, the policy table shows a pair consisting of a trust level of a server 20 managing a user permitted to use content and usage condition information defined for a server at that trust level, in addition to a pair consisting of a user or a user group managed by the server 10 and permitted to use content and usage condition information defined for the user or user group. In this example, stricter usage conditions (valid period and/or permitted operation) are imposed on a server at a lower trust level (server at trust level 2) than that for a server at a higher trust level (server at trust level 4).

According to this aspect, or an aspect involving permitted device information designating a server group, usage condition information is defined with respect to a server group (e.g., server groups categorized based on trust levels), rather than an individual server. That is, usage condition information is defined in units of a server group, rather than an individual server.

According to this aspect, a group to which each server 20 belongs may be changeable. Specifically, information stating a group to which each server 20 belongs, stored in the group memory 19, may be changeable. When the group to which the server 20 belongs is changed, usage condition to be applied to the server 20 is changed. Therefore, a user wishing to apply different usage conditions to a certain server 20 may modify the information stating a group to which the server 20 belongs, stored in the group memory 19, rather than changing the content of an individual policy. For example, a user wishing to restrict usage conditions defined for a user managed by a certain server 20 may lower the trust level of the server 20, without changing the content of an individual policy.

Also, according to this aspect, a new server 20 may be able to be added to any group. Specifically, information about a new server 20 may be able to be added to the memory 19. With a new server 20 added to a certain group, usage condition information defined for the group is applied to the newly-added server 20. That is, a user wishing to issue a license to a user managed by a new server may add information about the new server to the group memory 19, without changing the content of an individual policy.

Also, according to this aspect, the group memory 19 may store information for accessing the server 20, so as to be associated with the server 20.

Notably, although in the example shown in FIG. 1 one server 10 is shown as a server allowed to issue a license to a user managed by other servers, multiple number of such servers may exist. Also, the server 20 may have a function for issuing a license to a user managed by other server, and the server 10 may have a function for responding to an inquiry from other servers.

In the following, an operation of the information usage control system 1 according to this exemplary embodiment will be specifically described, while individually explaining policy registration, content registration, server trust level registration, and license issuance.

(Policy Registration)

Figure 9:
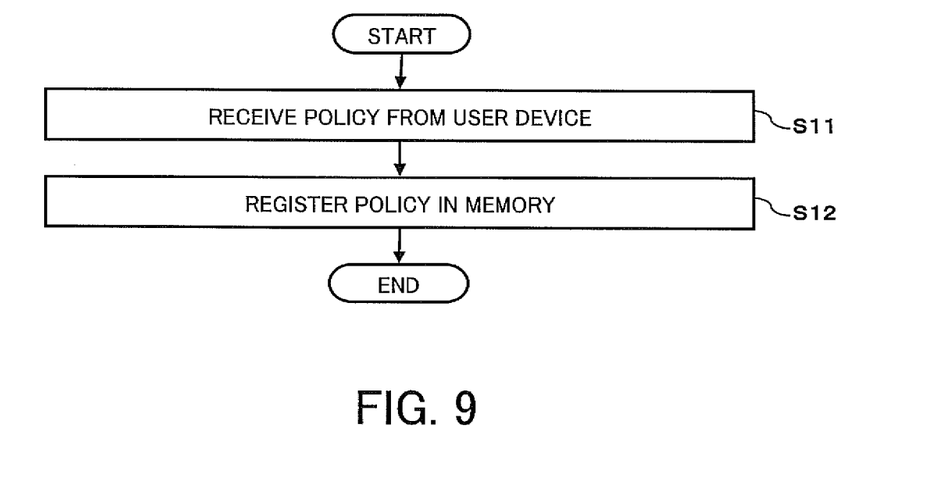
FIG. 9 is a flowchart showing one example of a policy registration process.

FIG. 9 is a flowchart of one example of a policy registration process. In the following, one example of a policy registration process will be described, with reference to FIG. 9.

The server 10 receives a policy from the user device 110 (S11).

Then, the server 10 registers the policy in the memory 12 of the server 10 (S12). Specifically, the server 10 produces a policy ID of the policy, and registers in the policy table a new record including the policy and the policy ID thereof in association with each other.

(Content Registration)

Figure 10:
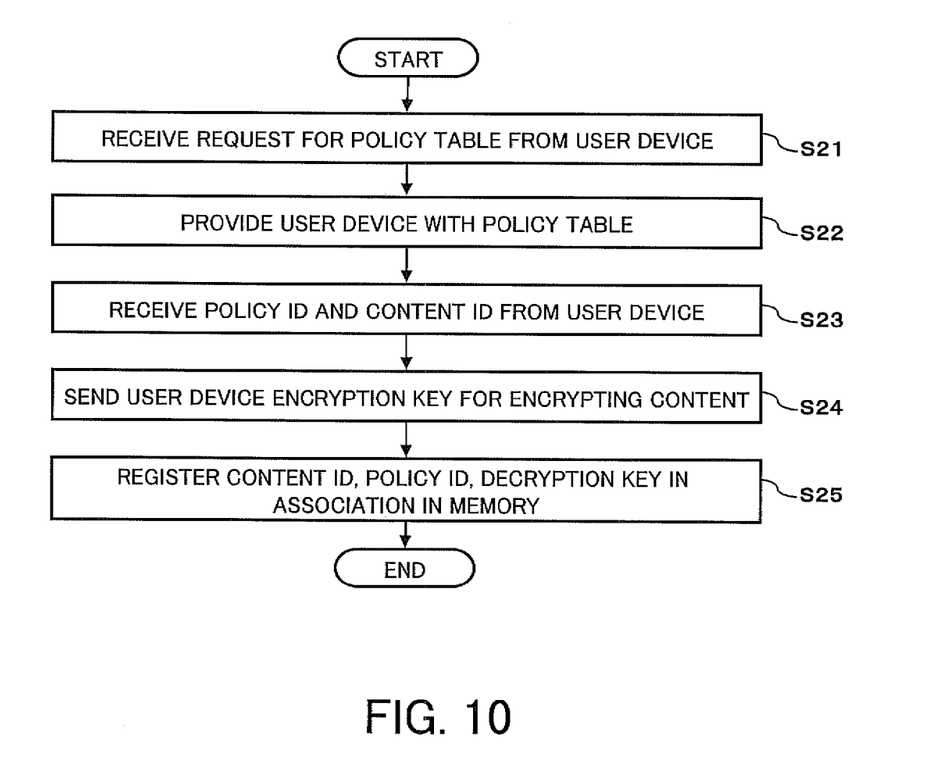
FIG. 10 is a flowchart showing one example of a content registration process.

FIG. 10 is a flowchart of one example of a content registration process. In the following, one example of a content registration process will be described, with reference to FIG. 10.

The server 10, upon receipt from the user device 110 of a request for a policy table (S21), provides the user device 110 with the policy table stored in the memory 12 of the server 10 (S22).

Then, the user selects from the policy table the policy ID of the policy which the user wishes to apply to the content. The user device 110 receives designation of the policy ID from the user, then produces a content ID of the content to be protected (protection target content), and sends the policy ID and content ID to the server 10.

Having received the policy ID and content ID from the user device 110 (S23), the server 10 sends the user device 110 an encryption key for encrypting the content (S24), and registers a new record including the policy ID, content ID, and decryption key for decrypting the content in association with one another, in the association table in the memory 12 of the server 10 (S25).

Having received the encryption key from the server 10, the user device 110 encrypts the protection target content, using the encryption key, to thereby produce encrypted content.

(Registration of Server Trust Level)

Figure 11:
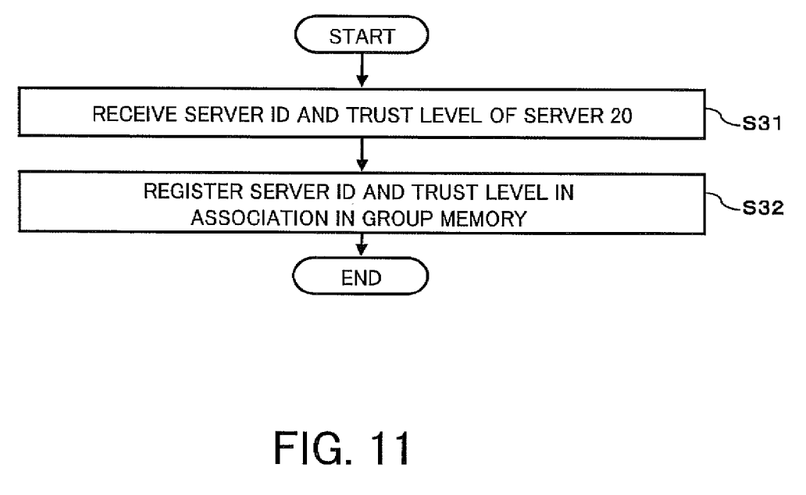
FIG. 11 is a flowchart showing one example of a process to register a trust level of a server.

FIG. 11 is a flowchart of one example of a server trust level registration process. In the following, one example of a server trust level registration process will be described, with reference to FIG. 11.

The server 10 establishes trust relation with the server 20 managing a user group permitted to use content managed by its own server 10.

Specifically, the server 10 receives, from the administrator or the like of the server 10, the server ID of the server 20 with which the server 10 has trust relation, and the trust level set on the server 20 (S31).

Then, the server 10 registers the received server ID and trust level in the group memory 19 so as to be associated with each other (S32).

(License Issuance)

Figure 12:
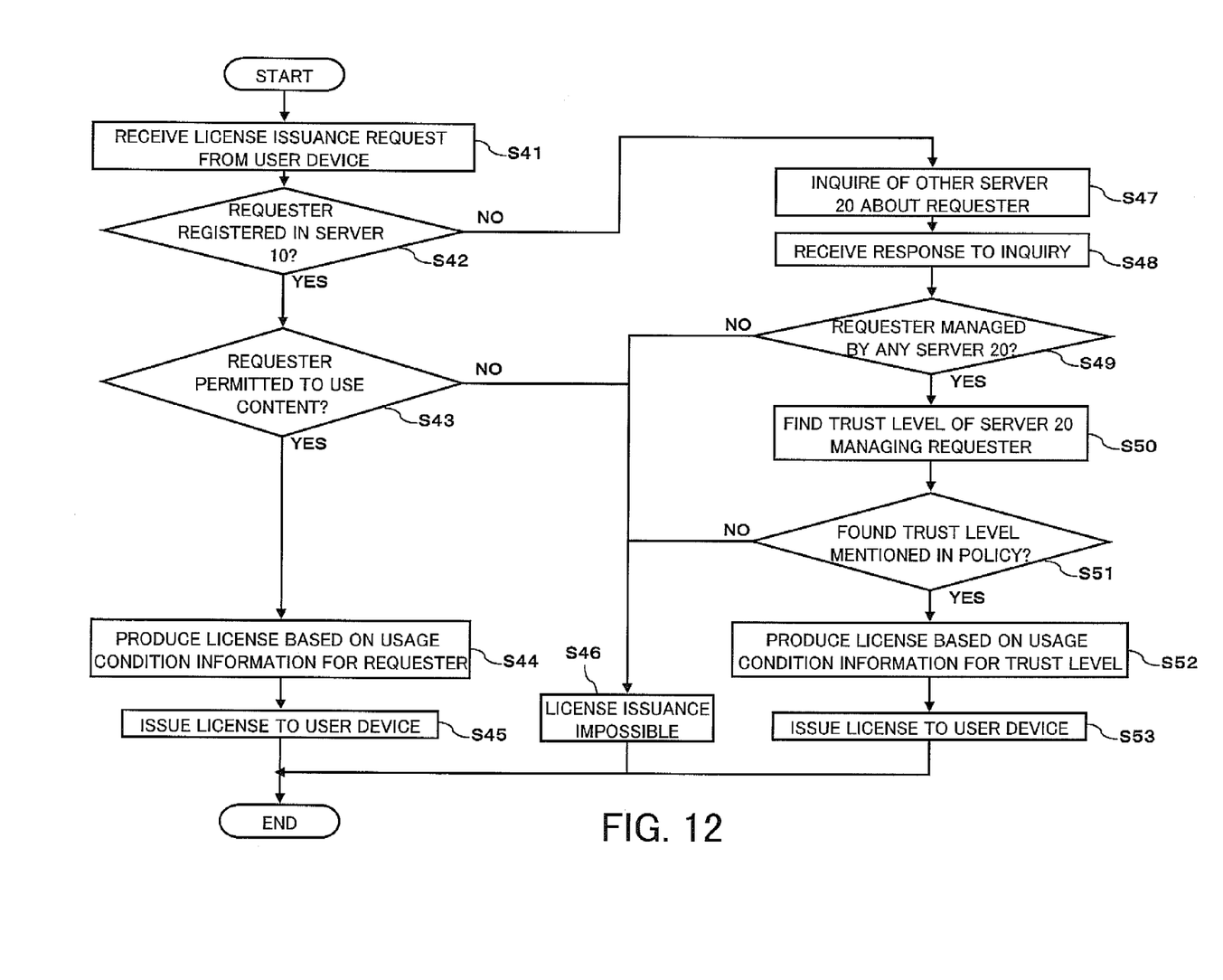
FIG. 12 is a flowchart showing one example of a license providing process.

FIG. 12 is a flowchart of one example of a license providing process. In the following, one example of a license providing process will be described, with reference to FIG. 12.

A user wishing to use encrypted content operates the user device 120 (specifically, application software for using encrypted content) to activate the encrypted content.

Upon receipt from the user of an instruction to activate the encrypted content, the user device 120 extracts the content ID from the encrypted content, and sends the server 10 a license issuance request which contains the content ID and user ID, in which the user ID may be input by the user or read from, as stored beforehand in, the user device 120.

Upon receipt of the license issuance request from the user device 120 (S41), the server 10 determines whether or not the user ID contained in the license issuance request is registered in the user memory 11 of the server 10 (S42).

When it is determined that the user ID is registered in the server 10 (S42: YES); that is, when the requester for a license is a user managed by the server 10, the server 10 carries out a process to issue a license to the requester, based on the policy associated with the content ID contained in the license issuance request, while referring to the information stored in the memory 12 of the server 10.

Specifically, the server 10 determines whether or not the user identified by the user ID contained in the license issuance request is a user permitted to use content, based on the policy associated with the content ID (S43).

When it is determined that the user is permitted to use the content (S43: YES), the server 10 produces a license which contains usage condition information defined for the user in the policy and a decryption key associated with the content ID contained in the license issuance request (S44), and issues the produced license to the user device 120 (S45).

On the other hand, when it is determined that the user is not permitted to use the content (S43: NO), the server 10 sends the user device 120 information stating that license issuance is impossible (S46).

When it is determined in step S42 that the user ID is not registered in the server 10; that is, the requester for a license is not a user managed by the server 10, the server 10 inquires of the server 20 with which the server 10 has trust relation (specifically, the server 20 registered in the group memory 19) about whether or not the user ID contained in the license issuance request is registered in the server 20 (S47).

Upon receipt of the inquiry, the server 20 determines whether or not the inquired user ID is registered in the user memory 11 of the server 20, and sends the result of determination to the server 10. The server 10 receives a response from the server 20 in response to the inquiry (S48).

Based on the response to the inquiry, the server 10 determines whether or not the requester for a license is a user managed by any server 20 (S49).

When it is determined that the requester is a user managed by any server 20 (S49: YES), the server 10 carries out a process to issue a license to the requester, while referring to the information stored in the memory 12 of the server 10 and information stored in the group memory 19, based on the policy associated with the content ID contained in the license issuance request.

Specifically, the server 10 finds the trust level of the server 20 managing the requester, while referring to the information stored in the group memory 19 (S50).

The server 10 then determines whether or not the found trust level is mentioned in the policy, while referring to the policy associated with the content ID contained in the license issuance request (S51).

When it is determined that the trust level is mentioned in the policy (S51: YES), the server 10 produces a license which contains usage condition information set in the policy with respect to the trust level and a decryption key associated with the content ID contained in the license issuance request (S52), and issues the produced license to the user device 120 (S53).

On the other hand, when it is determined that the trust level is not mentioned in the policy (S51: NO), the server 10 sends the user device 120 information stating that license issuance is impossible (S46).

When it is determined at step S49 that the requester is not a user managed by any server 20; that is, the requester is neither a user managed by the server 10 nor a user managed by any server 20, the server 10 sends the user device 120 information stating that license issuance is impossible (S46).

The license is issued in the process in S45 or S53. After receiving the license from the server 10, the user device 120 decrypts the encrypted content, using the decryption key contained in the license, to thereby restore the original content, and permits the user to use the content, based on the usage condition information contained in the license. For example, when the usage condition permits only review, the user device 120 displays the content on the screen upon receipt of a review instruction from the user, but does not print the content even when having received a print instruction from the user, showing on the screen a message stating, e.g., no print permission granted.

In the following, a specific case of a license issuance process will be described as an example. It is determined here that the contents stored in the user memories 11 in the servers 10 and 20A are such as that shown in FIG. 4; the policy table of the memory 12 of the server 10 is such as that shown in FIG. 8; the association table of the memory 12 of the server 10 is such as that shown in FIG. 6; and the content stored in the group memory 19 of the server 10 is such as that shown in FIG. 7.

(b1) Requester Having User ID "User 3" Requesting Server 10 to Issue License for Content Having Content ID "Content 1"

According to FIG. 4, the user ID "user 3" is registered in the user memory 11 of the server 10. According to the association table in FIG. 6, the content ID "content 1" is associated with the policy ID "policy 1," and according to the policy table in FIG. 8, the user ID "user 3" is registered as a permitted user in relation to the policy ID "policy 1." Further, usage condition information "valid period: unlimited, permitted operation: review, edit" is set with respect to the "user 3." Therefore, a license containing usage condition information "a valid period: unlimited, permitted operation: review, edit" is issued to the requester.

(b2) Requester Having User ID "User 1" Requesting Server 10 to Issue License for Content Having Content ID "Content 1"

According to FIG. 4, the user ID "user 1" is not registered in the user memory 11 of the server 10, but is registered in the user memory 11 of the server 20A, and according to FIG. 7, the trust level of the server 20A is "4." Further, according to the association table in FIG. 6, the content ID "content 1" is associated with the policy ID "policy 1." Also, according to the policy table in FIG. 8, the "server at trust level 4" is registered as a permitted user in relation to the policy ID "policy 1," and usage condition information "valid period: one month from the issue date, permitted operation: print" is set with respect to a "server at trust level 4." Therefore, a license containing usage condition information "valid period: one month from the issue date, permitted operation: print" is issued to the requester.

Second Exemplary Embodiment

In the following, an information usage control system according to a second exemplary embodiment will be described. Notably, elements common to those of the information usage control system according to the first exemplary embodiment are given identical reference numerals, and description thereof is not repeated.

In this exemplary embodiment, the response unit 18 of the server 20 provides the server 10 with usage condition information describing content usage conditions set with respect to the server 10. For example, the response unit 18 sends a response containing usage condition information set with respect to the server 10. The providing unit 16 of the server 10 provides the requester with a license, based on the usage condition information in relation to the permitted device information and the usage condition information provided by the server 20.

Note that usage condition information provided by the server 20 will hereinafter be referred to as "server 20 side usage condition information," while usage condition information associated with permitted device information stored in the server 10 will be hereinafter referred to as "server 10 side usage condition information."

The manners for providing a license according to this exemplary embodiment may include, e.g., the below (c1) to (c3) (c1) The server 10 side usage condition information contains one or more items, each of which can be defined as stating that the server 20 side usage condition information is applied.

Figure 13:
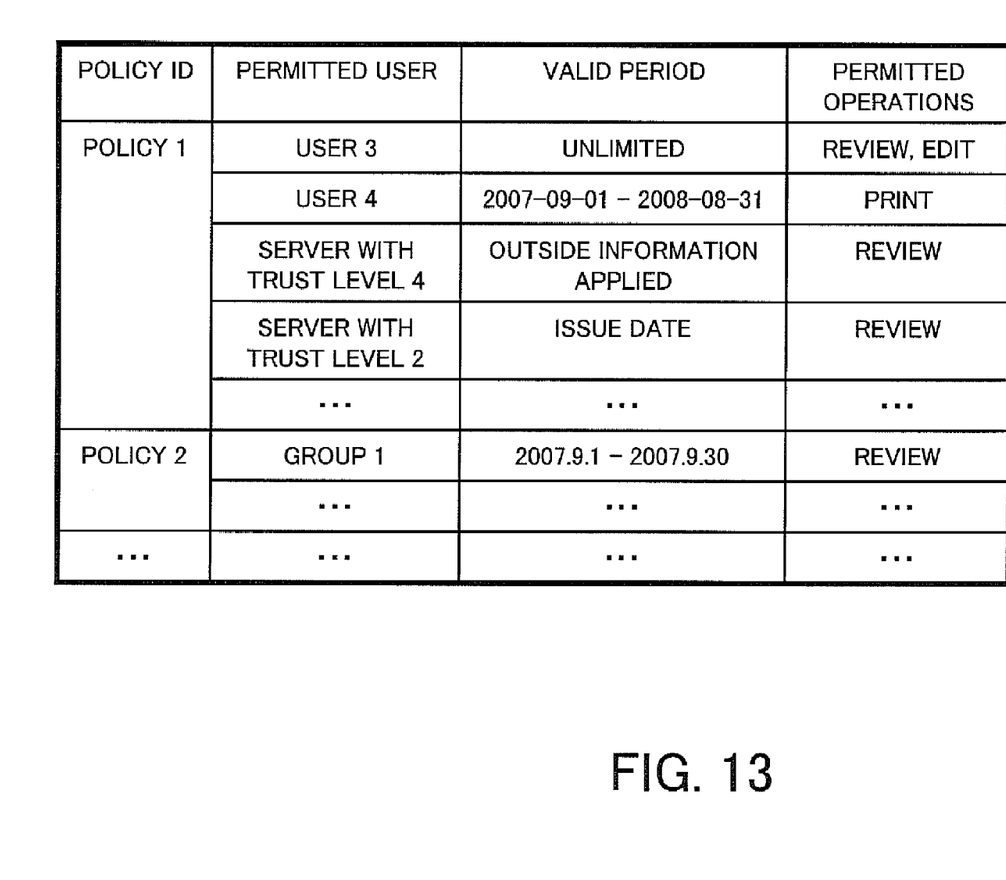
FIG. 13 is a diagram showing one example of a policy table of the server 10 according to a second exemplary embodiment.

FIG. 13 shows one example of a policy table of the server 10 according to this aspect. In the example shown in FIG. 13, the valid period concerning the policy having the policy ID "policy 1" (hereinafter denoted as a policy "policy 1") states "outside information applied," meaning that the server 20 side usage condition information is applied.

With respect to an item, among those of the server 10 side usage condition information, stating that the server 20 side usage condition information is applied, the providing unit 16 of the server 10 applies the information set for the corresponding item of the server 20 side usage condition information, before a license is issued based on the resultant usage condition information.

(c2) The server 10 side usage condition information contains one or more items, while the server 20 side usage condition information contains an item corresponding to some or all of the above-described one or more items. The providing unit 16 of the server 10 replaces the descriptions set for the respective items of the server 10 side usage condition information with the descriptions set for the respective corresponding items of the server 20 side usage condition information, before a license is issued based on the resultant usage condition information.

(c3) According to the above described aspect (c1) or (c2), the providing unit 16 of the server 10 uses the server 20 side usage condition information when the server 20 managing the requester for a license belongs to a predetermined group, and otherwise does not use the server 20 side usage condition information. Specifically, the providing unit 16 of the server 10 determines whether or not the server 20 managing the requester belongs to a predetermined group, and uses the server 20 side usage condition information when it is determined that the server 20 belongs to the predetermined group, and otherwise does not use the server 20 side usage condition information. For example, the providing unit 16 of the server 10 uses the server 20 side usage condition information when the trust level of the server 20 to which the requester belongs is equal to or higher than a predetermined value, and otherwise does not use the server 20 side usage condition information.

Figure 14:
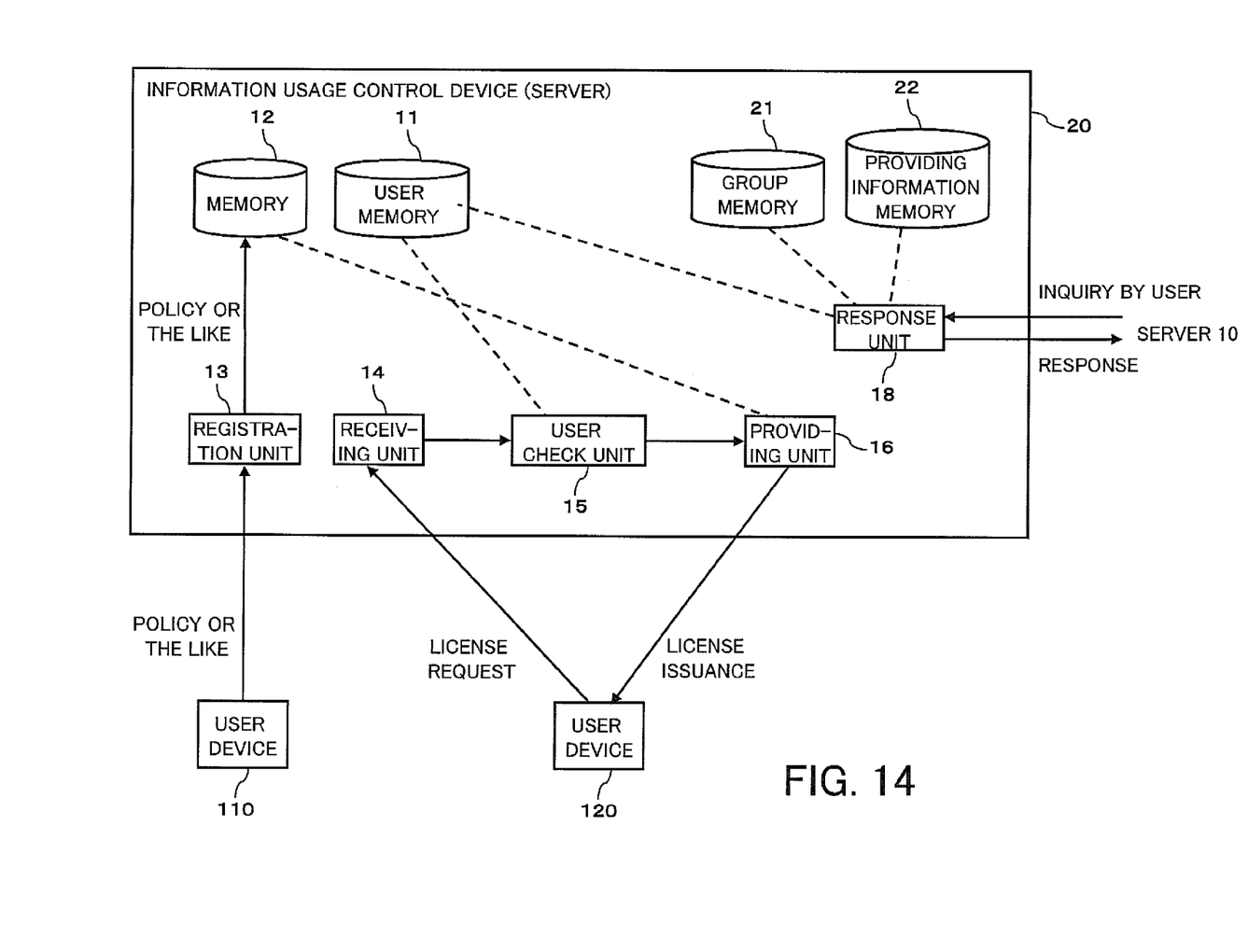
FIG. 14 is a block diagram showing one example of a structure of a server 20 according to the second exemplary embodiment.

According to one aspect, as shown in FIG. 14, the server 20 has a group memory 21 and a providing information memory 22.

The group memory 21 stores information stating a group to which the server 10 to which the usage condition information is to be provided belongs, so as to be associated with the server 10. As described above, two or more servers 10 can exist.

No particular restriction is imposed on the manner of grouping the servers 10, although in one example, the servers 10 are grouped according to a trust level which indicates an extent by which the server 20 trusts the server 10. For example, trust levels are set with respect to the respective servers 10, and registered in the group memory 21.

Figure 15:
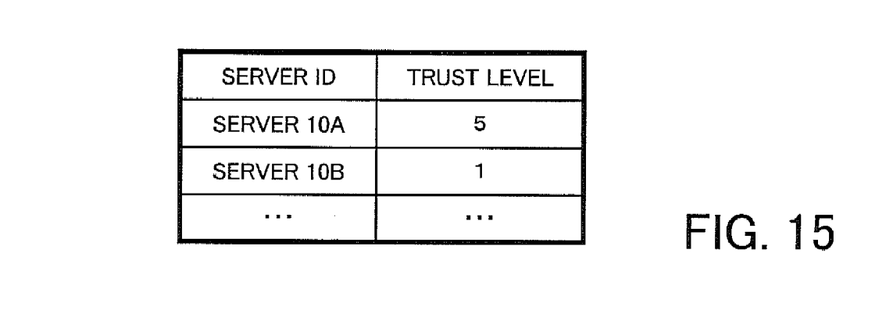
FIG. 15 is a diagram showing one example of content stored in a group memory of the server 20.

FIG. 15 shows one example of content stored in the group memory 21 of the server 20. In the example shown in FIG. 15, the group memory 21 stores, for each server 10, the server ID, or identification information identifying the server 10, and a trust level set with respect to that server 10, so as to be associated with each other.

The providing information memory 22 stores information stating a group consisting of a server 10 and usage condition information to be provided to a server 10 belonging to that group, so as to be associated with each other.

Figure 16:
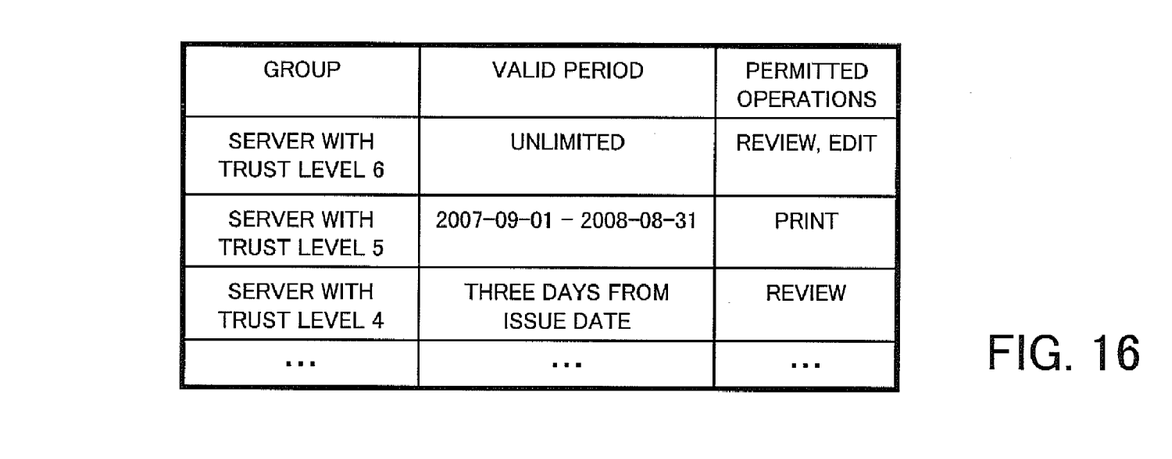
FIG. 16 is a diagram showing one example of content stored in a providing information memory of the server 20.

FIG. 16 shows one example of content stored in the providing information memory 22 of the server 20. In the example of FIG. 16, the providing information memory 22 stores information stating a server 10 group and corresponding usage condition information (valid period and permitted operation) so as to be associated with each other.

Upon receipt of an inquiry from the server 10, the response unit 18 of the server 20 finds the trust level of the server 10 having sent the inquiry, with reference to the group memory 21, then sends usage condition information associated with the found trust level, together with the result of checking the user, to the server 10 having sent the inquiry, with reference to the providing information memory 22. When the user in relation to the inquiry is not a user managed by the server 20, the response unit 18 may not send usage condition information to the server 10.

In the following, a specific case of a license issuance process will be described as an example.

Assume here that a requester having the user ID "user 1" requests the server 10 having the server ID "server 10A" (hereinafter denoted to as "server 10A") to issue a license for content "content 1."

Further, assume that the content stored in the user memories 11 of the servers 10A and 20A is such as that shown in FIG. 4; the policy table of the memory 12 of the server 10A is such as that shown in FIG. 13; the association table of the memory 12 of the server 10A is such as that shown in FIG. 6; content stored in the group memory 19 of the server 10A is such as that shown in FIG. 7; content stored in the group memory 21 of the server 20A is such as that shown in FIG. 15; and content stored in the providing information memory 22 of the server 20A is such as that shown in FIG. 16.

As the user ID "user 1" is not registered in the user memory 11 of the server 10A, according to FIG. 4, the server 10A inquires of the server 20A about whether or not the user ID "user 1" is registered in the server 20A.

The user ID; namely, "user 1," in relation to the inquiry is registered in the user memory 11 of the server 20A, according to FIG. 4. The trust level of the server 10A "server 10A" having sent the inquiry is "5," according to FIG. 15, and the usage condition information "valid period: 2007.9.1-2008.8.31, permitted operation: print" is set with respect to a "server at trust level 5," according to FIG. 16. Therefore, the server 20A sends the server 10A a response which contains the usage condition information "valid period: 2007.9.1-2008.8.31, permitted operation: print."

The trust level of the server 20A having sent the inquiry is "4," according to FIG. 7; and the policy ID "policy 1" is associated with the content ID "content 1," according to the association table in FIG. 6. A "server at trust level 4" is registered as a permitted user in relation to the policy ID "policy 1," according to the policy table in FIG. 13; and the usage condition information "valid period: outside information applied, permitted operation: review" is defined for a "server at trust level 4." Thus, the server 10A sets the valid period information included in the usage condition information provided by the server 20A; that is, "2007.9.1-2008.8.31," with respect to the valid period item included in the usage condition information defined for a "server at trust level 4," and issues to the requester a license containing the usage condition information "valid period: 2007.9.1-2008.8.31, permitted operation: review."

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An information usage control system including a first information usage control device and one or more second information usage control devices that each provides, upon receipt from a user managed by its own information usage control device a request for usage information for control target information, the user with the usage information for using the control target information, based on usage control information for controlling use of the control target information, wherein the first information usage control device comprises
a memory that stores the usage control information which possibly contains permitted device information designating a second information usage control device permitted to use the control target information and usage condition information describing usage condition for the control target information, in relation to the permitted device information, so as to be associated with the control target information,
a receiving unit that receives from a requester the request for the usage information for the control target information,
an inquiry unit that inquires of the second information usage control device, when the requester is not a user managed by its own information usage control device, about whether or not the requester is managed by the second information usage control device, and
a providing unit that provides the requester, when it is found, based on a response in response to the inquiry and the information stored in the memory, that the requester is a user managed by the second information usage control device designated by the permitted device information associated with the control target information, with the usage information for using the control target information, based on the usage condition information in relation to the permitted device information, and the second information usage control device comprises a response unit that sends the response in response to the inquiry from the first information usage control device to the first information usage control device.

2. The information usage control system according to claim 1, wherein
the first information usage control device further comprises a group memory that stores information stating a group to which the second information usage control device belongs, so as to be associated with the second information usage control device, and
the memory stores, as the permitted device information, information designating a group to which the second information usage control device belongs, and
the providing unit, when it is found, based on the information stored in the group memory, that the requester is a user managed by the second information usage control device belonging to a group designated by the permitted device information associated with the control target information, provides the requester with the usage information, based on the usage condition information in relation to the permitted device information.

3. The information usage control system according to claim 1, wherein
the response unit provides the first information usage control device with the usage condition information describing usage condition for the control target information, defined for the first information usage control device, and
the providing unit provides the requester with the usage information, based on the usage condition information provided.

4. The information usage control system according to claim 2, wherein
the response unit provides the first information usage control device with the usage condition information describing usage condition for the control target information, defined for the first information usage control device, and
the providing unit provides the requester with the usage information, based on the usage condition information provided.

5. The information usage control system according to claim 3, wherein
the providing unit uses the usage condition information provided, when a group to which the second information usage control device managing the requester belongs is a predetermined group, and does not use the usage condition information provided, when a group to which the second information usage control device managing the requester belongs is not the predetermined group.

6. The information usage control system according to claim 4, wherein
the providing unit uses the usage condition information provided, when a group to which the second information usage control device managing the requester belongs is a predetermined group, and does not use the usage condition information provided, when a group to which the second information usage control device managing the requester belongs is not the predetermined group.

7. An information usage control device, comprises:
a receiving unit that receives from a requester a request for usage information for control target information,
an inquiry unit that inquires of one or more other information usage control devices about whether or not the requester is a user managed by the other information usage control device, in which the one or more other information usage control device each provide, upon receipt from a user managed by its own information usage control device of the request for the usage information for the control target information, the user with the usage information for using the control target information, based on usage control information for controlling use of the control target information, and a memory that stores the usage control information which possibly contains permitted device information designating the other information usage control device permitted to use the control target information and usage condition information describing usage conditions for the control target information, in relation to the permitted device information, so as to be associated with the control target information, and a providing unit that provides the requester, when the requester is not the user managed by its own information usage control device and it is found, based on a response in response to the inquiry and the information stored in the memory, that the requester is a user managed by the other information usage control device designated by the permitted device information associated with the control target information, with the usage information for using the control target information, based on the usage condition information in relation to the permitted device information.

8. A method for providing usage information, comprising receiving from a requester a request for usage information for control target information, inquiring of one or more other information usage control devices about whether or not the requester is a user managed by the other information usage control device, in which the one or more other information usage control devices each provide, upon receipt from a user managed by its own information usage control device of the request for the usage information for the control target information, the user with the usage information for using the control target information, based on usage control information for controlling use of the control target information, and providing the requester, while referring to a memory that stores the usage control information which possibly contains permitted device information designating the other information usage control device permitted to use the control target information and usage condition information describing usage conditions for the control target information, in relation to the permitted device information, so as to be associated with the control target information, when the requester is not a user managed by its own information usage control device and it is found, based on a response in response to the inquiry and the information stored in the memory, that the requester is a user managed by the other information usage control device designated by the permitted device information associated with the control target information, with the usage information for using the control target information, based on the usage condition information in relation to the permitted device information.

9. A computer readable medium storing a program causing a computer to execute a process for providing usage information, the process comprising receiving from a requester a request for usage information for control target information, inquiring of one or more other information usage control devices about whether or not the requester is a user managed by the other information usage control device, in which the one or more other information usage control devices each provide, upon receipt from a user managed by its own information usage control device of the request for the usage information for the control target information, the user with the usage information for using the control target information, based on usage control information for controlling use of the control target information, and providing the requester, while referring to a memory for that storing stores the usage control information which possibly contains permitted device information designating the other information usage control device permitted to use the control target information and usage condition information describing usage conditions for the control target information, in relation to the permitted device information, so as to be associated with the control target information, when the requester is not a user managed by its own information usage control device and it is found, based on a response in response to the inquiry and the information stored in the memory, that the requester is a user managed by the other information usage control device designated by the permitted device information associated with the control target information, the requester with the usage information for using the control target information, based on the usage condition information in relation to the permitted device information.

* * * * *